United States Patent Office 3,391,320
Patented July 2, 1968

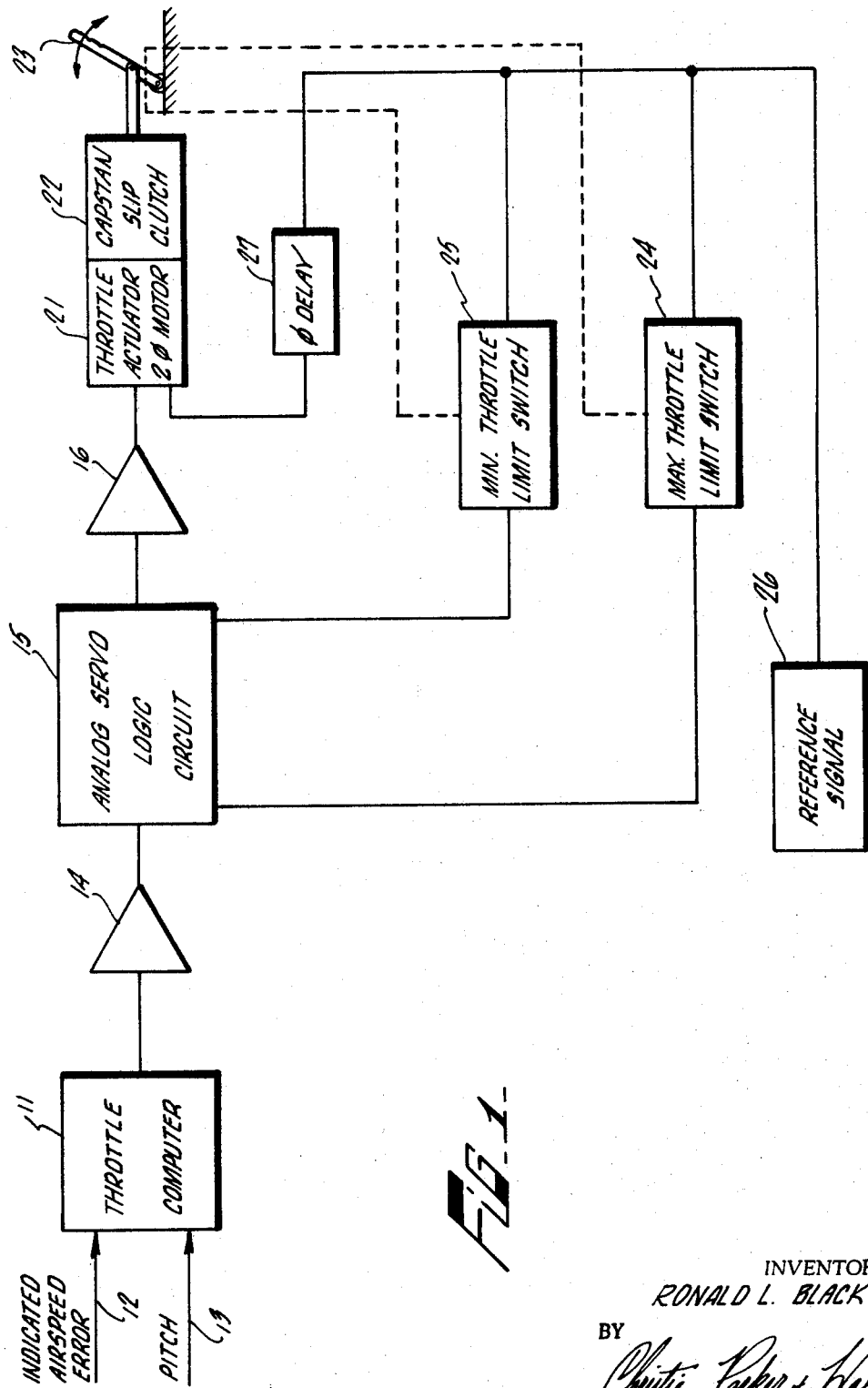

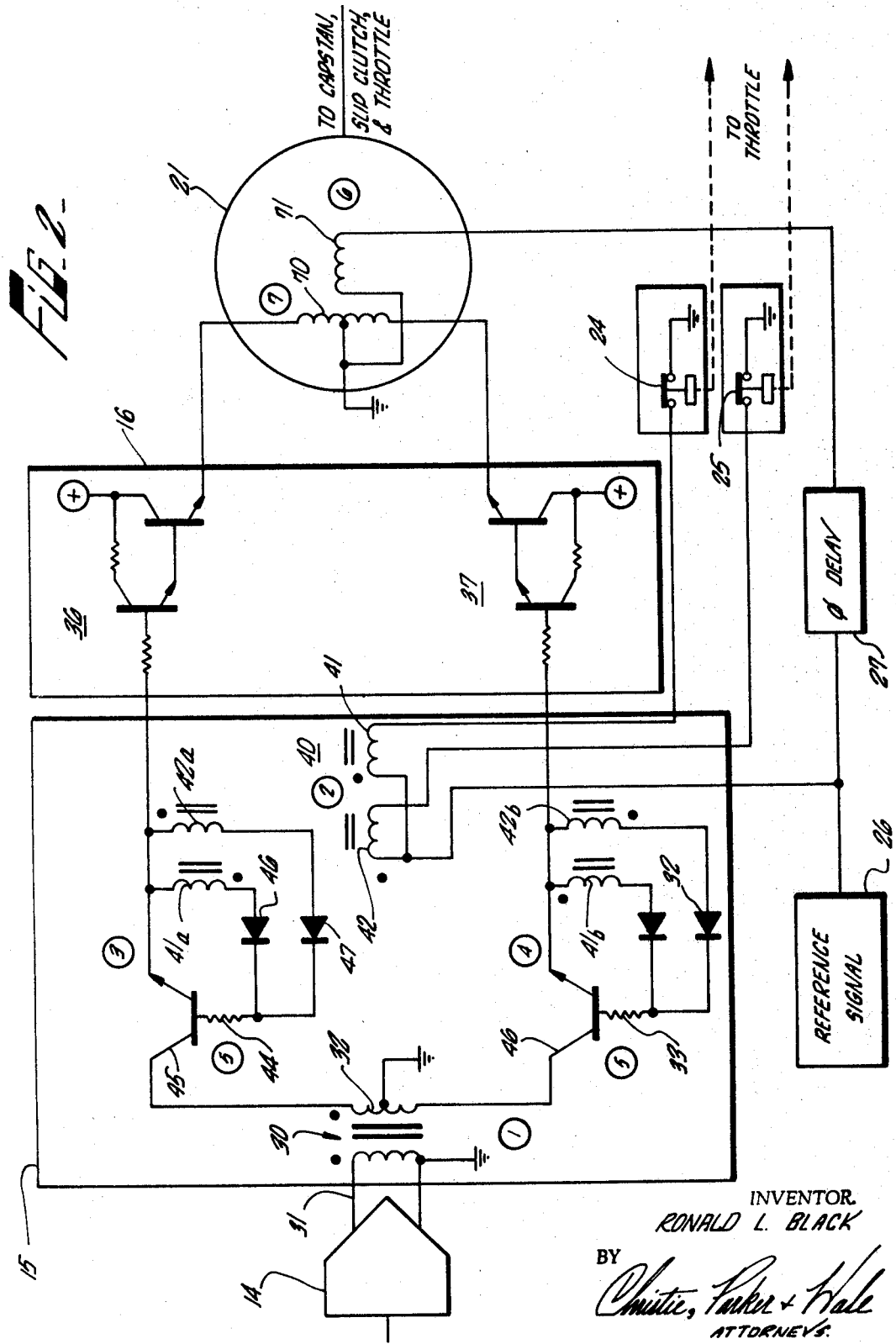

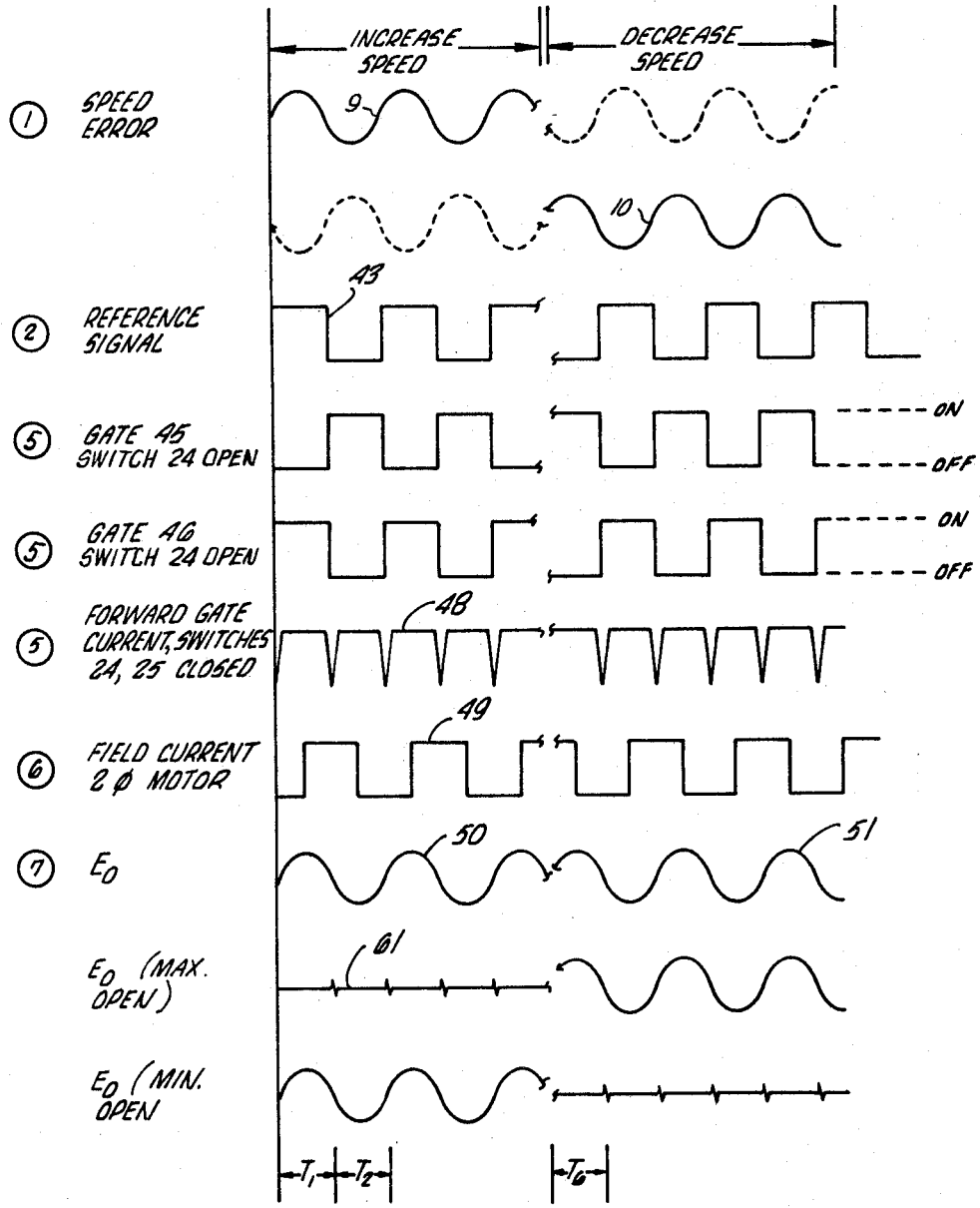
FIG_3

3,391,320
AUTOMATIC THROTTLE CONTROL SYSTEM EMPLOYING A LOGIC GATE CIRCUIT
Ronald L. Black, Isaaquah, Wash., assignor to Lear Siegler, Inc., Santa Monica, Calif., a corporation of California
Filed June 14, 1965, Ser. No. 463,805
3 Claims. (Cl. 318—266)

ABSTRACT OF THE DISCLOSURE

An automatic throttle control system having a throttle movable over a predetermined range between a maximum and a minimum throttle position. Limit switches are coupled to the throttle and are operable by the throttle when in its maximum or minimum position. The control system further includes a pair of gates connected between a center-tapped secondary of a transformer and a center-tapped control winding of an alternating-current motor which is coupled to the throttle. The primary winding of the transformer has signals applied to cause selected movement of the throttle with the relative phase of the signals indicating the direction of movement. The conduction state of the gates is controlled by a circuit that is responsive to a reference signal and to the conduction states of the limit switches. The reference signal is applied with phase-delay to the field winding of the motor where it is electrically compared with the signal passed by the gates to establish the proper direction of movement of the motor and throttle.

This invention relates in general to automatic speed control systems and more particularly relates to a new and improved throttle control system having a throttle positioning range defined by maximum and minimum throttle extremes.

It is desirable in automatic speed control systems to utilize electrical signals for advancing and retarding a throttle mechanism which controls the speed of a motor powering the vehicle being controlled. Typical of such systems is an automatic landing approach control system for aircraft as described and claimed in a patent appliction filed on even date herewith having Ser. No. 463,548 and assigned to the same assignee as the present invention.

In an automatic landing system for aircraft, maximum and minimum throttle limits are required to maintain the engine within design specifications. These maximum and minimum limits affect the engine compression and lift requirements for the airplane and serve to keep them within safe, established, predetermined values. These limits have often been established by micro switches which are actuated by the mechanical movement of the throttle in the vehicle.

The function of the maximum and minimum limit switches may be appreciated by assuming the vehicle to be controlled is an airplane, and that a pilot introduces a speed command which differs from the speed of the aircraft at the instant of the pilot's command. This action by the pilot causes a large error signal to be generated in a known manner such that the throttle of the aircraft is automatically moved in a proper direction to aid the vehicle in achieving the commanded airspeed. If the error signal so generated is significantly large as is often the case, the throttle is automatically moved to a limit position wherein it engages a maximum throttle limit switch.

In the past, these limit switches have controlled powdered particle clutches which were so designed that if either a maximum or a minimum limit switch was engaged, then the only possible direction of movement for the throttle was in a direction opposite that introduced by the pilot's command. In general, these powdered particle magnetic clutches are bulky, expensive and require complex control coils and amplifiers. Thus, they are disadvantageous for many uses, including, in particular, automatic control systems for aircraft wherein it is highly desirable to keep the weight and size of automatic landing systems to a minimum.

Powdered particle magnetic clutches of the prior art, have in some instances been replaced by direct current motors. Such direct current motors are also complex, costly, and require rather elaborate control mechanisms.

The foregoing disadvantages of the prior art are avoided by the throttle control system in accordance with the principles of this invention in that a simple and inexpensive two-phrase alternating current servomotor may be utilized to automatically position a throttle within predetermined limits defined by maximum and minimum throttle limit switches. An error signal, having first and second out of phase signals indicative of a required increase or decrease in speed, is selectively passed or blocked by logic gate means which in turn are controlled by the maximum and minimum throttle limit switches. These gate means are connected between the error signal source and a control winding for the two-phase throttle actuator motor. Mechanical actuation of either of these maximum or minimum throttle limit switches automatically control an electrical bias for the logic gate means so that error signals commanding only a throttle movement away from the actuated switch are applied to the control windings of the two-phase throttle actuator motor. This motor responds to these signals by automatically moving the throttle away from the actuated limit switch.

The foregoing principles and features of this invention may more readily be understood by reference to the accompanying drawings in which:

FIG. 1 is a block diagram of a throttle control system in accordance with the principles of this invention;

FIG. 2 is a detailed combined block diagram and circuit schematic of the logic gating means and throttle control system of this invention; and FIG. 3 is a waveform diagram that is helpful in promoting a clear understanding of the circuit operation of FIGS. 1 and 2.

In FIG. 1, a throttle computer 11 is shown receiving two inputs. One input is an indicated airspeed error signal on lead 12 and the other is a pitch signal on lead 13. This throttle computer may be any computer which is well known in the art that responds to typical input signals such as those shown to generate an output indicative of the required movement by the throttle to achieve the commanded airspeed. Typical output signals from computer 11 will generally fall within one of three possibilities. For example, if the airspeed of the craft is the same as that which has been established by the pilot, no output signal is generated or delivered by computer 11. If the airspeed of the craft on the other hand is less than the speed commanded by the pilot, the output signal will be in phase with a reference signal applied to the field winding of the throttle actuating motor. An output signal which is 180° out of phase with the reference signal will be generated by the computer 11 if the commanded speed by the pilot is less than the actual speed of the craft.

Outputs from computer 11 are amplified by a signal amplifier 14 of any well known type and are applied to the analog servo logic gating means 15 of this invention. The logic gating means 15 of this invention passes input signals from computer 11 and amplifier 14 to a power output amplifier stage 16 which, in turn, is connected to a throttle actuator motor 21. This motor 21 responds to the output from logic gating means 15 and amplifier 16 by a proper direction of rotation so that a throttle device 23 is moved in the required direction to compensate for the error input.

A capstan slip clutch 22 may be utilized to provide the mechanical coupling between the throttle actuator motor 21 and the throttle linkage 23. A pair of ON-OFF throttle limit switches such as the maximum limit switch 24 and the minimum limit switch 25 are mechanically actuated by movements of the throttle 23. These limit switches are normally closed, and are opened by movement of the throttle 23 to predetermined maximum or minimum throttle positions.

A reference signal source 26 is provided, which signal source generates a continually varying repetitive signal. The repetitive reference signal from source 26 is applied through a suitable phase delay circuit 27 to the field winding of throttle actuator motor 21. This output signal from reference source 26 is also applied to logic gating means 15 via the maximum and minimum limit switches 24 and 25. If the throttle 23 is driven sufficiently forward to engage the maximum limit switch 24, this switch opens and interrupts the reference signal 26 from gating means 15. Logic gating means 15 responds to the opening of the maximum limit switch 24 and removal of reference signal from source 26 by thereafter preventing any further passage of signals from computer 11 which are phased to drive the throttle 23 forward. During this period in which the maximum throttle limit switch 24 is open, however, the minimum throttle limit 25 remains closed and the reference signal from source 26 is gated through the closed switch 25 to logic gating means 15. Logic means 15 in response to a reference signal from a source 26 through the closed minimum limit switch 25 passes only throttle retarding signals from throttle computer 11.

In FIG. 2, a detailed circuit schematic of the analog servo logic gating means 15 is shown. Amplifier 14 is repeated in FIG. 2 and as shown, may utilize a grounded transformer primary winding 31 for inductively coupling error signals from computer 11 to the center tapped secondary winding 32. Conventional dot symbols are used on the transformer windings of FIG. 2 to denote the polarity of signals coupled from a primary winding to a secondary winding. Thus, in accordance with the dot symbols, a speed error signal such as 1 of FIG. 3, on winding 31 appears on the upper portion of secondary winding 32 in the same phase and polarity as signal 9. The signal on the lower portion of winding 32 is of opposite polarity to that of the upper portion signal.

In FIG. 3, the speed error waveforms are shown solid and broken. It should be understood of course, with reference to FIG. 3, that only one of the solid waveforms will be present at any one time from computer 11 of FIG. 1. The broken waveforms are included in FIG. 3 merely to clearly illustrate the 180° phase difference between an increase speed signal 9 and a decrease speed signal 10 when compared with the phase of reference signal 43. Circled numbers at the waveform rows of FIG. 3 correspond to similarly numbered points of FIG. 2 where such signals appear. Thus, reference signal 43 appears at the two transformers 39 and 40. These transformers comprise primary windings 41 and 42, each of which are inductively coupled to two separate transformer secondary windings 41a, 41b, and 42a, 42b respectively. A phase delay circuit 27 is connected to the output of the reference signal source 26 which delay circuit may be any well known phase delay of the prior art having a phase delay chosen to produce a 90° difference between the input at the transformers 39 and 40 and the input at the fixed phase field winding 71 of the throttle actuator motor 21. This 90° phase delay is shown by waveforms 43 and 49 of FIG. 3.

The throttle actuator motor 21 may be any suitable two-phase alternating current servomotor. This servomotor, as is well known, rotates in a direction controlled by the phase difference between signals present at the control winding 70 as compared with the phase of the reference signal at field winding 71. Thus, if the signal appearing at the control winding 70 is out of phase in one direction, with respect to the signal at the field winding 71, the direction of the rotation of the armature 21 may, for example, be clockwise, whereas if the phase signal difference between the two windings is reversed, then the direction of rotation of motor 21 will be counterclockwise. Motor 21, as described hereinbefore in connection with the description of FIG. 1, moves the throttle linkage 23, by appropriate mechanical couplings, in a direction proper to compensate for any speed error indicated by the throttle computer 11.

A pair of maximum and minimum throttle limit switches 24 and 25 are shown connected between ground and the ends of the primary windings 41 and 42 of transformers 40 and 39, respectively. The conductive condition of these limit switches 24 and 25 determine, in a manner to be described hereinafter, the phase of the signal that appears at the control winding 70 of throttle actuator motor 21.

Table 1 summarizes the operation of the circuit of FIG. 2, and is useful in connection with the pulse waveforms of FIG. 3 to more fully describe the new and novel circuit operations in accordance with the principles of this invention.

TABLE 1

| Max. Limit Switch | Min. Limit Switch | Error Signal Phase, Degree | Direction of Motor Rotation | Throttle Condition |
| --- | --- | --- | --- | --- |
| Closed | Closed | 0 | Clockwise | Advance. |
| Do | do | 180 | Counterclockwise | Retard. |
| Open | do | 0 | None | Hold. |
| Do | do | 180 | Counterclockwise | Retard. |
| Closed | Open | 0 | Clockwise | Advance. |
| Do | do | 180 | None | Hold. |

The first condition defined in Table 1 assumes that the maximum and minimum throttle limit switches 24 and 25 are in their normally closed condition. This normally closed condition for switches 24 and 25 exists when the throttle 23, FIG. 1, is within its predetermined limit positions as defined by the physical location of switches 24 and 25 with respect to the throttle arm. In accordance with the first row of Table 1, an error signal phase of 0°, as compared with the reference signal 2 of FIG. 3, is applied to the primary winding 31 of transformer 30. This signal is inductively coupled to secondary winding 32 of transformer 30. Both the maximum and minimum limit switches 24 and 25 are closed during this application, and the motor rotation will be clockwise. This rotation of motor 21 advances throttle 23.

This advance throttle operation may be understood by reference to FIG. 2 and the pulse waveform of FIG. 3 wherein a 0° error signal 9 is shown. Secondary 32 has a grounded center tap and thus the alternating input signal 9 has its positive and negative portions thereof applied to a pair of transmission gates 45 and 46 respectively. The conductive condition of transistor gates 45 and 46 is controlled by the reference signal 26 and the condition of the throttle limit switches 24 and 25. The reference signal from source 26 supplies base drive current to transistor gates 45 and 46.

Forward gate current with the maximum and minimum limit switches 24 and 25 closed is shown as waveform 48 at row 5 of FIG. 3. Waveform 48 results from the positive portion of reference signal 43, during the time interval $T_1$ FIG. 3, being conducted to ground through the primary windings 41, 42 and the closed throttle limit switches 24, 25. During positive portions of reference signal 43, in accordance with the polarity of transformer windings 41 and 42, transistor 45 is driven conductive by base current supplied through diode 46. This base current establishes a forward bias voltage at resistor 44, which is connected to the base electrode of transistor 45. Transistor 46 is also supplied with forward base current and a bias voltage at resistor 33 via diode 32. The collector of transistor 46, however, is negative during the time interval $T_1$ and thus transistor 46, although supplied with forward bias current, is nevertheless nonconductive. During interval $T_2$, the negative half of the error signal 9 together with the reference signal 43, in a manner similar to that just described, is conducted through the lower transistor gate 46 but is not conducted through the upper transistor gate 45. Positive and negative portions of error signal 9 during $T_1$ and $T_2$ are passed by the transistor gates 45 and 46 when such gates are in a conductive condition. These signals are the inputs for the upper and lower power amplifier circuits 36 and 37. These power amplifier circuits 36 and 37 may be any suitable amplification stage such as a PUSH-PULL class B amplifier of a type well known in the art. During periods $T_1$ and $T_2$, the signal portions of error signal 9 passed through the conductive gates 45 and 46 are amplified in a PUSH-PULL manner and are applied in their amplified condition to the control winding 70 which is connected to the outputs of the amplifiers 36 and 37. Waveforms 50 of FIG. 3 represents the amplified output signal that is developed at the control winding 70 of the throttle actuator motor 21. This output signal, in a manner that is well known in the art, coincides properly with the phase of the field current signal 49 of FIG. 3 such that the motor is driven in a clockwise direction. Clockwise rotation of motor 21 is properly geared to the throttle linkage 23 through a capstan and slip clutch 22 so that the throttle 23, FIG. 1, advances.

During the time interval $T_6$ the speed error signal 10 which is 180° out of phase with respect to the reference signal 43 is coupled to secondary 32 of transformer 30. Transistors 45 and 46 are again biased in the manner just described. However, the opposite phase of the input signal to the PUSH-PULL amplifier 36, 37 now produces an output waveform 51 at the control winding 70 of throttle actuator motor 21. This output signal 51 at the control winding 70 with respect to the phase of the field current shown by waveform 49, is such that the motor is driven in a counterclockwise direction. A counterclockwise direction, as shown in the second row of Table 1, develops a throttle retarding action.

As shown in the third row of Table 1, it is assumed that the error signal delivered to the automatic throttle control system was of sufficient duration and of a proper phase to drive throttle 23 forward until it engaged the maximum limit switch 24. This engagement opens switch 24 thus removing any excitation by the reference signal 43 from signal source 26 through the winding 41 of transformer 40. This condition, with a maximum switch 24 assumed open, is shown in FIG. 3 by waveform 61. Switch 24, by interrupting the excitation signal from primary transformer winding 41, removes the voltage from secondary winding 41a, during the first positive half of error signal 9, FIG. 3. Accordingly, there is no base drive current provided for transistor gate 45 because diodes 46 and 47 are nonconductive; and as shown in FIG. 3, gate 45 is OFF during interval $T_1$. With transistor gate 45 OFF there is no input signal provided to amplifier 36 and, accordingly, no signals are developed across the control winding 70 of the throttle two-phase actuator motor 21.

FIG. 3 further discloses that during the time interval $T_1$ transistor gate 46 is forward-biased because of excitation still applied to transformer 42. However, the signal present at the collector of forward biased transistor 46 is a negative signal and therefore not passed and amplifier 37 does not have an output. During the time interval $T_2$ the roles of transistor gates 45 and 46 are reversed and the increased speed error signal 9 is blocked similarly. Blocking of error signal 9, as shown by waveform 61 in FIG. 3, results in a zero output $E_o$ at control winding 70. Thus, in accordance with the principles of this invention, signals which would tend to further advance the throttle are blocked from the control windings of the throttle actuator motor 21.

It is essential, that if error signal 10 appears, indicating that a speed less than the present airspeed of the craft is required, that the throttle control automatically allows throttle 23 to be retarded. Signal 10 is gated through transistor gates 45 and 46 when the maximum limit switch 24 is open. Gating of the decreased speed error signal 10 is provided by excitation from signal source 26 through the transformer primary winding 42. At the time interval $T_6$ the reference signal 43 is negative and the error signal 10 is positive. The negative reference signal forward-biases diode 47 and the positive portion of the error signal 10 is gated through the conducting transistor 45 and amplified by amplifier 36 for its application to the control winding 70 of motor 21. This control signal is of a proper phase in accordance with Table 1 to drive the motor in a counterclockwise direction and retard the throttle position.

Again, for purposes of explanation, assume that the error signal just described which required a retarding of the throttle is sufficient in magnitude to drive the throttle until the minimum throttle limit is reached. At the minimum throttle position, throttle limit switch 25 is opened and excitation from transformer winding 42 is interrupted. As shown in FIG. 3, under this condition error signals such as signal 9 that require an increase in speed can be gated through the logic circuit 15 whereas error signals such as 10, reflecting a decrease in throttle speed, are blocked.

It is to be understood that the foregoing features and principles of this invention are merely descriptive, and that many departures and variations thereof are possible by those skilled in the art, without departing from the spirit and scope of this invention.

What is claimed is:
1. An automatic throttle control system comprising:
 (a) a throttle movable over a predetermined range between a maximum and a minimum throttle position;
 (b) a two-phase alternating-current motor having a shaft linked to said throttle for selectively positioning said throttle within said range, said motor having a field winding and a control winding with a grounded center tap and two end terminals;
 (c) a source of first and second electrical signals indicating by their relative phases respectively required increases and decreases in said throttle position;
 (d) a transformer having a primary winding and a grounded center tap secondary winding with two end terminals;
 (e) means for connecting the primary winding of said transformer to said source;
 (f) a source of repetitive alternating-current reference signals;
 (g) a first electronic gate connected between one end terminal of said secondary of said transformer and and one end terminal of said control winding;
 (h) a second electronic gate connected between the other terminal of said secondary of said transformer and the other end terminal of said control winding;
 (i) a pair of limit switch means, one of said limit switch means operable by movement of said throttle to said maximum throttle position and the remaining one of said switch means operable by movement of said throttle to said minimum throttle position;
 (j) gate control means responsive to the reference signal and to the position of each of the limit switch means for gating "on" both gates when both limit switch means are in the same conduction state, for alternately gating "on" the electronic gates by gating "on" the first gate during the positive half cycle of said reference signal and the second gate during the negative half cycle of said reference signal when the limit switch means associated with the maximum throttle position is operated, and for alternately gating "on" the gates by gating "on" the second gate during the positive half cycle of said reference signal and the first gate during the negative half cycle of said reference signal when the limit switch means associated with the minimum throttle position is operated;

(k) phase-delay means connected to the output of said reference signal source, and (l) means for connecting the output of said phase-delay means to said field winding.

2. An automatic throttle control system comprising:
(a) a throttle movable over a predetermined range between a maximum and a minimum throttle position;
(b) a motor having a shaft linked to said throttle for selectively positioning said throttle within said range;
(c) a source of first and second electrical signals indicating respectively required increases and decreases in said throttle position;
(d) a pair of limit switch means, one of said switch means operable by movement of said throttle to said maximum throttle position and the remaining one of said switch means operable by movement of said throttle to said minimum throttle position;
(e) first and second gating means connected between said source and said motor;
(f) a source of repetitive alternating-current reference signals;
(g) means responsive to said reference signals and the conduction state of each of said limit switch means for biasing said first and second gating means "on" when both limit switch means are in the same conduction state and for alternately biasing said first and second gating means "on" during successive alternations of said reference signal when said limit switch means have different conduction states;

(h) an electrical signal delay circuit connected to the output of said reference signal souce, and (i) means for connecting the output of said delay circuit to said motor.

3. A control circuit comprising, in combination, an alternating-current motor having a winding controlling its direction of rotation within limits, a pair of electronic gates, the output end of one gate being connected to one end of said winding and the output end of the other gate being connected to the opposite end of said winding, signal input means operable to apply a signal voltage to the input ends of said gates with the voltage applied to the second gate being 180° out of phase with respect to the voltage applied to the first gate of the pair, a source of alternating-current reference signals, means responsive to said reference signals and to the position of said motor with respect to its limit of operation in each direction for biasing both gates "on" when the motor is between its limit positions and for alternately gating the gates "on" during successive alternations of said reference signal when the motor is at one of its limit positions.

References Cited

UNITED STATES PATENTS 2,884,579  44/1959  Kaltenbach _____ 318—267

ORIS L. RADER, *Primary Examiner.*

H. W. COLLINS, K. L. CROSSON,

*Assistant Examiners.*